US012624980B2

(12) United States Patent
Edney et al.

(10) Patent No.: US 12,624,980 B2
(45) Date of Patent: May 12, 2026

(54) STREAMING CURRENT MONITOR

(71) Applicant: DBG IP LIMITED, Auckland (NZ)

(72) Inventors: Daniel Bryan Laird Edney, Irvine, CA (US); Grant Anthony Bowring, Auckland (NZ)

(73) Assignee: DBG IP LIMITED, Auckland (NZ)

( * ) Notice: Subject to any disclaimer, the term of this patent is extended or adjusted under 35 U.S.C. 154(b) by 0 days.

(21) Appl. No.: 19/314,450

(22) Filed: Aug. 29, 2025

(65) Prior Publication Data

US 2025/0389568 A1     Dec. 25, 2025

Related U.S. Application Data

(63) Continuation of application No. PCT/IB2025/053673, filed on Apr. 8, 2025.

(60) Provisional application No. 63/641,147, filed on May 1, 2024.

(51) Int. Cl.
   G01F 13/00       (2006.01)
   C02F 1/52        (2023.01)

(52) U.S. Cl.
   CPC .......... G01F 13/001 (2013.01); C02F 1/5209 (2013.01)

(58) Field of Classification Search
   None
   See application file for complete search history.

(56) References Cited

U.S. PATENT DOCUMENTS

| | | | |
|---|---|---|---|
| 3,368,145 A | 2/1968 | Gerdes | |
| 4,297,640 A | 10/1981 | Moore | |
| 6,107,803 A | 8/2000 | Wang | |
| 10,092,888 B2 | 10/2018 | Barksdale | |
| 2016/0369786 A1 * | 12/2016 | Vehmaa | .................. F04B 9/125 |
| 2021/0010720 A1 * | 1/2021 | Veprik | ..................... F25B 9/14 |
| 2021/0208100 A1 | 7/2021 | Veal | |

OTHER PUBLICATIONS

Hach AF7000 Streaming Current Monitor Datasheet downloaded from https://nz.hach.com/af7000-streaming-current-monitor-230v/product-downloads?id=62946312536.
International Search Report in corresponding International Application No. PCT/IB2025/053673.
Written Opinion in corresponding International Application No. PCT/IB2025/053673.
Comments by Applicant on the PCT Written Opinion in corresponding International Application No. PCT/IB2025/053673.

\* cited by examiner

*Primary Examiner* — Farhana A Hoque
(74) *Attorney, Agent, or Firm* — Niels Haun; Dann, Dorfman, Herrell & Skillman, P.C.

(57) ABSTRACT

A streaming current monitor comprises a cylinder in fluid communication with a flow-path between an inlet and outlet and a piston received in the cylinder. A drive mechanism is configured to drive reciprocation of the piston in the cylinder to move colloid into and out of the cylinder via an annular space between the piston and cylinder. A pair of electrodes are exposed in a wall of the cylinder and spaced apart in a moving direction of the piston to sense a charge characteristic of the colloid. The drive mechanism is a linear actuator comprising a stationary part and a moving part connected to the piston via a shaft.

20 Claims, 6 Drawing Sheets

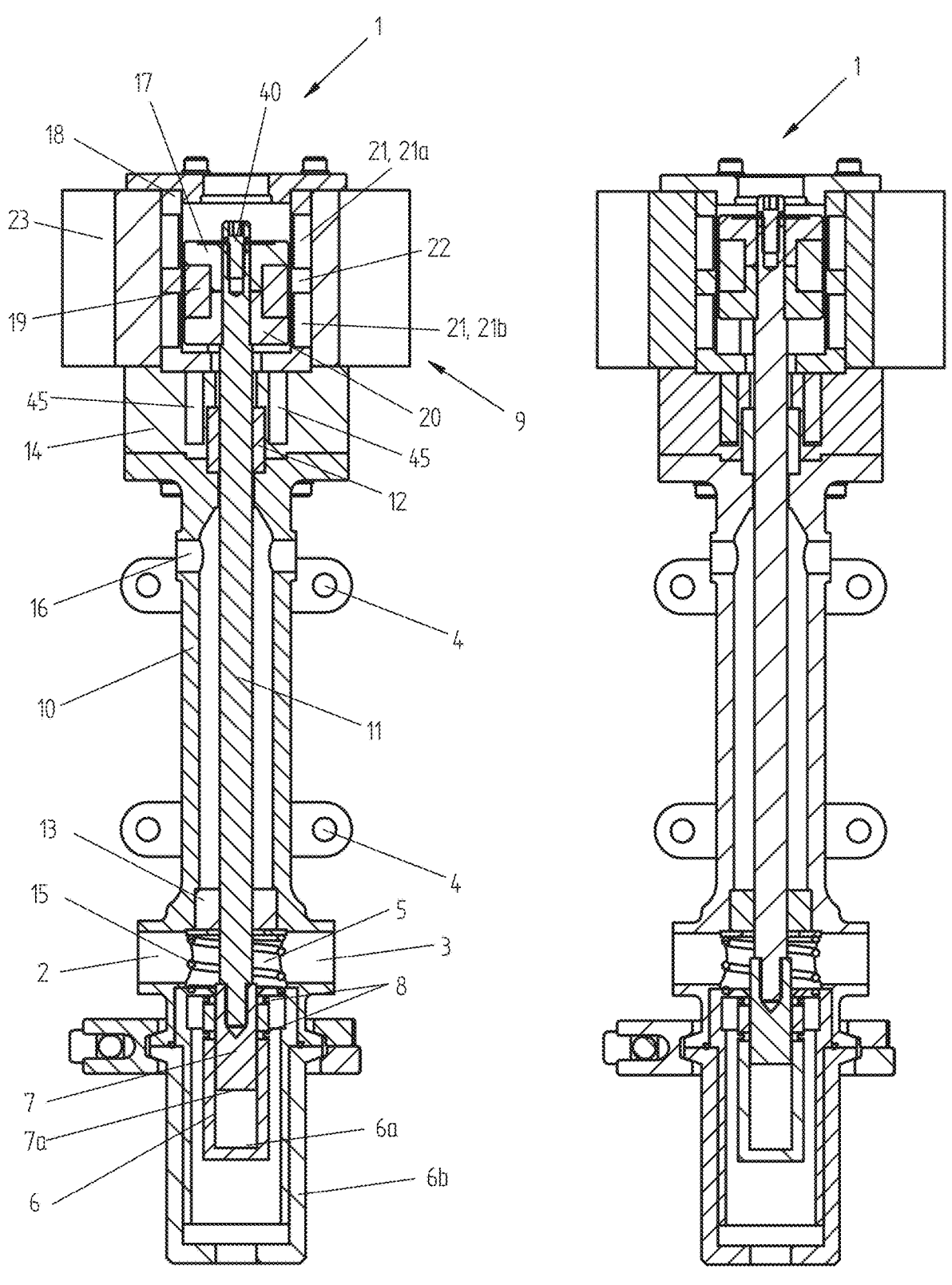
FIGURE 3                                    FIGURE 4

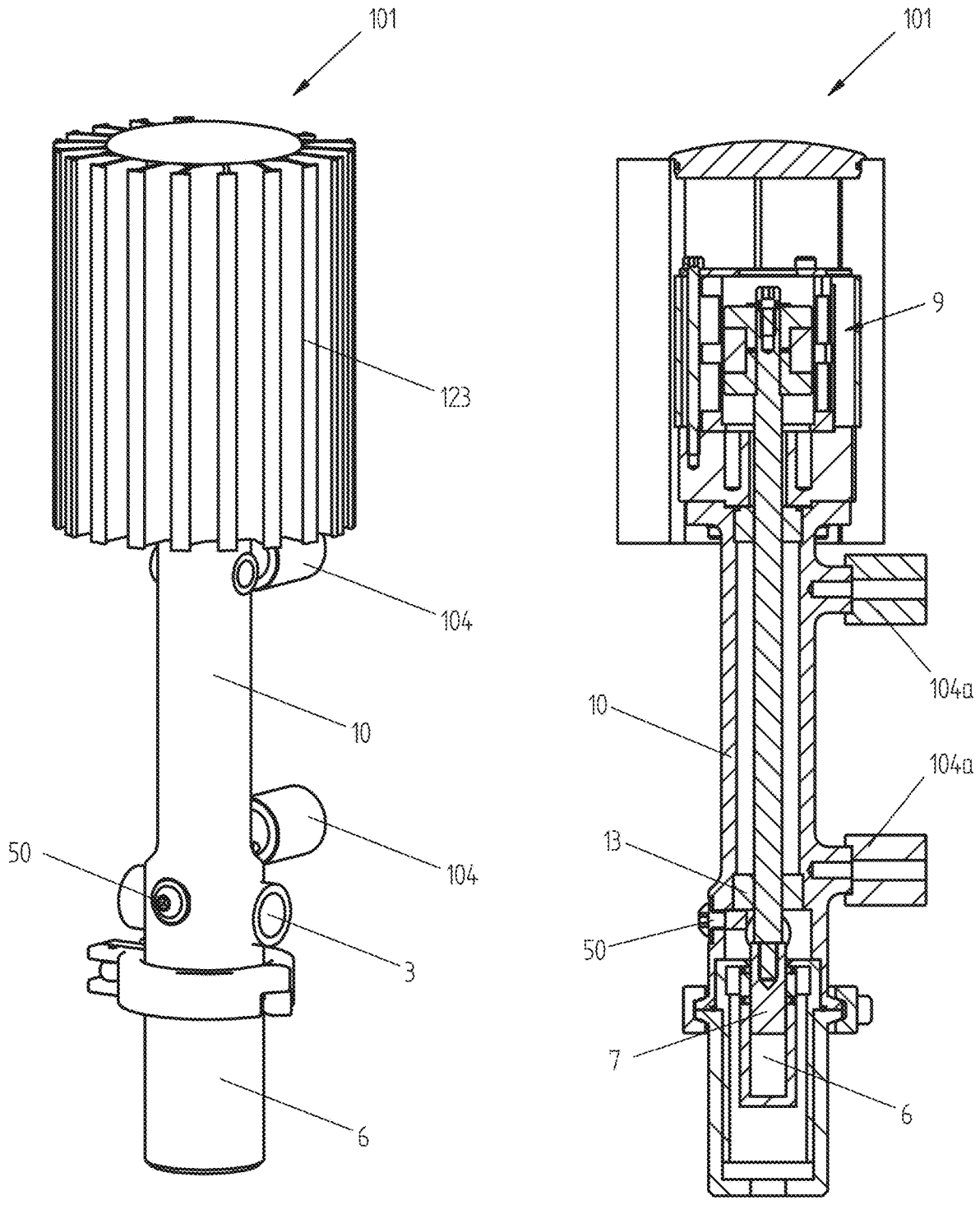
FIGURE 14                              FIGURE 15

STREAMING CURRENT MONITOR

CORRESPONDING APPLICATION

This application is bypass continuation application of International Patent Application PCT/IB2025/053673 which is based on the provisional specification filed in relation to U.S. Patent Application No. 63/641,147, the entire contents all of which is incorporated herein by reference.

TECHNICAL FIELD

This invention relates to a streaming current monitor (SCM) for use in measuring the charge characteristic of a colloid, and in particular for use in determining a coagulant dosage rate in a water treatment plant.

BACKGROUND

A Streaming Current Monitor (SCM) is used to measure a charge characteristic of a colloid. The charge characteristic can be used to determine an amount of coagulant to be dosed to a colloid to cause the particles of the colloid to flocculate and be separated from the fluid medium of the colloid, e.g. by sedimentation, filtration or other separation method.

An SCM has a piston received in a cylinder. A motor and gear box arrangement drives the piston via a linkage or eccentric cam to reciprocate in the cylinder. The reciprocating piston draws colloid into and out of the cylinder to pass over a pair of electrodes. The electrodes provide a streaming current sensor which can be calibrated to provide a direct real-time measure of the charge characteristic of the colloid which is related to the number of particles in suspension in the fluid medium of the colloid.

Coagulant is added to the colloid to neutralise the charge of the suspended particles, causing the particulars to flocculate. SCM are used in water (e.g. fresh water and waste water) treatment plants to provide real time feedback control the amount of coagulant required to separate the solids from the water in real time. The SCM is used to continuously measure the charge characteristic after a rapid mixing stage where coagulant is mixed with the colloid. A dosing controller adjusts the coagulant dosing rate to maintain a set streaming current output from the SCM to optimise the amount of coagulant dosed to the system.

Reliability issues have plagued prior art streaming current monitors. The motor and gear box arrangement of prior art SCMs generate excessive heat which must be dissipated. The effect of wear and tear on the moving parts including measurement surfaces and drive mechanisms results in significant measurement errors. Any unevenness in the piston stroke due to misalignment or looseness in the mechanical drive will translate directly into a distortion of the streaming current signal. Changes in the condition of the sensing surfaces will change the manner in which they become coated with colloidal material and equilibrium constants between the surfaces and the solution. These effects are normally the most significant on the surface of the piston. Once the wear reaches a certain level the streaming current reading produced becomes unstable, and commonly drifts in an unpredictable manner.

The reference to any prior art in the specification is not, and should not be taken as, an acknowledgement or any form of suggestion that the prior art forms part of the common general knowledge in any country.

DISCLOSURE OF INVENTION

It is an object of the present invention to address any one or more of the above problems or to at least provide the industry with a useful choice.

According to one aspect of the present invention there is provided a streaming current monitor (SCM), the SCM comprising:

an inlet and an outlet to receive and deliver a flow of colloid to and from the SCM;

a cylinder in fluid communication with a flow-path between the inlet and outlet, and a piston received in the cylinder to reciprocate therein, a drive mechanism to drive reciprocation of the piston in the cylinder to move colloid into and out of the cylinder via an annular space between the piston and cylinder, a pair of electrodes exposed in a wall of the cylinder and spaced apart in a moving direction of the piston, and a shaft extending between the piston and the drive mechanism, wherein the drive mechanism is a linear actuator comprising a stationary part and a moving part, the moving part connected to the shaft.

In some embodiments, the moving part of the linear actuator comprises a permanent magnet and the stationary part comprises at least one wire coil to generate a magnetic force to cause the moving part, shaft and piston to reciprocate.

In some embodiments, the stationary part comprises two wire coils spaced apart in a moving direction of the moving part, a first coil primarily interacts with a north end of the permanent magnet and a second coil primarily interacts with a south end of the permanent magnet.

In some embodiments, the SCM comprises at least one magnetic position sensor to provide an indication of a position of the permanent magnet of the moving part of the linear actuator, the at least one position sensor located at an axial centre region of the permanent magnet.

In some embodiments, the at least one position sensor comprises a pair of position sensors spaced apart in a moving direction of the permanent magnet, and a controller configured to determine the position of the moving part independent of a variation in a magnetization of the permanent magnet based on output from the pair of position sensors.

In some embodiments, the shaft is removably connected to the moving part of the actuator, so that the shaft and piston is removable from the SCM without removing the permanent magnet from the linear actuator.

In some embodiments, the SCM comprises a pair of bearings supporting the shaft, the pair of bearings located between the moving part and the piston. In some embodiments, the pair of bearings are arranged towards opposed ends of the shaft.

In some embodiments, the shaft is many times longer than the piston.

In some embodiments, the pair of bearing comprises a piston end bearing and a drive end bearing, and wherein the cylinder is removably mounted to a main body of the SCM to provide access to the piston end bearing and the linear actuator is removably mounted to the main body to provide access to the drive end bearing.

In some embodiments, the SCM comprises an anti-rotation mechanism to prevent or limit relative rotation between the piston and cylinder.

In some embodiments, the anti-rotation mechanism comprises at least one permanent magnet fixed to one of the moving part and stationary part to interact with a member formed from a magnet material fixed to the other one of the moving part and stationary part.

In some embodiments, the anti-rotation mechanism comprises a pair of permanent magnets fixed to one of the moving part and stationary part to interact with a pair of member formed from a magnet material fixed to the other one of the moving part and stationary part, and wherein the pair of permanent magnets are arranged with opposed polarities interacting with the corresponding pair of members.

In some embodiments, the moving part, shaft and piston form a moving assembly arranged to reciprocate vertically, and wherein the SCM comprises a support mechanism to support the weight of the moving assembly.

In some embodiments, the support mechanism comprises at least one lifting permanent magnet arranged above or below the moving part of the linear actuator to attract or repel the moving part to support the weight of the moving assembly. Where the moving part comprises a permanent magnet, the lifting magnet is arranged to attract or repel the permanent magnet of the moving part. For example, the lifting magnets are mounted below the moving part and arranged to repel the moving part permanent magnet. Or, the lifting magnets are mounted above the moving part and arranged to attract the moving part permanent magnet.

In some embodiments, the support mechanism is configured to provide a lifting force substantially equal to the weight of the moving assembly. In some embodiments, the support mechanism supports the moving assembly approximately at the centre of its stroke with the SCM unpowered In some embodiments, a force generated by an electrical current flowing in one or more coils of the linear actuator is sufficient to drive reciprocation of the moving assembly without substantially providing a force required to support the weight of the moving assembly.

In some embodiments, the SCM comprises a power supply, a position sensor and a controller configured to energise the linear actuator and drive reciprocation of the piston.

In some embodiments, the SCM comprises a heatsink in thermal contact with wire coil(s) of the actuator, and wherein the heatsink forms a housing around at least part of the linear actuator.

According to a second aspect of the present invention there is provided a streaming current monitor (SCM), the SCM comprising:

an inlet and an outlet to receive and deliver a flow of colloid to and from the SCM;

a cylinder in fluid communication with a flow-path between the inlet and outlet, and a piston received in the cylinder to reciprocate therein, a drive mechanism to drive reciprocation of the piston in the cylinder to move colloid into and out of the cylinder via an annular space between the piston and cylinder, a pair of electrodes exposed in a wall of the cylinder and spaced apart in a moving direction of the piston, and a shaft extending between the piston and the drive mechanism, wherein the drive mechanism is a linear actuator comprising a stationary part comprising at least one wire coil and a moving part comprising at least one permanent magnet, the at least one permanent magnet connected to the shaft. The moving part, shaft and piston together form a moving assembly. The at least one coil is configured to generate a magnetic force to drive reciprocation of the moving assembly.

The second aspect of the invention may comprise any one or more of the features described above in relation to the first aspect of the invention.

According to a third aspect of the present invention there is provided a linear actuator comprising:

a stationary part comprising at least one wire coil and a moving part comprising at least one permanent magnet, and a pair of magnetic position sensors to provide an indication of a position of the permanent magnet of the moving part of the linear actuator, the pair of position sensors located at an axial centre region of the permanent magnet and spaced apart in a moving direction of the permanent magnet, and a controller configured to determine the position of the moving part independent of a variation in a magnetization of the permanent magnet based on output from the pair of position sensors.

According to a fourth aspect of the present invention there is provided a linear actuator comprising:

a stationary part and a moving part, and an anti-rotation mechanism to prevent or limit relative rotation between the piston and cylinder, wherein the anti-rotation mechanism comprises:

at least one permanent magnet fixed to one of the moving part and stationary part to interact with at least one member formed from a magnet material fixed to the other one of the moving part and stationary part.

In some embodiments, the stationary part comprises at least one permanent magnet and the moving part comprises at least one wire coil.

According to a fifth aspect of the present invention there is provided a linear actuator comprising:

a stationary part and a moving part, the moving part arranged to reciprocate vertically, and a support mechanism to support the weight of the moving part and a connected load.

In some embodiments, the stationary part comprises at least one permanent magnet and the moving part comprises at least one wire coil.

In some embodiments, the support mechanism comprises at least one lifting permanent magnet arranged above or below the moving part of the linear actuator to attract or repel the moving part to support the weight of the moving part and the connected load. In some embodiments, the support mechanism is configured to provide a lifting force substantially equal to the weight of the moving part and the connected load. For example, with the SCM unpowered, the support mechanism supports the moving part and the connected load approximately at the centre of its stroke. In some embodiments, a force generated by an electrical current flowing in the one or more coils of the linear actuator is sufficient to drive reciprocation of the moving part and connected load without substantially providing a force required to support the weight of the moving part and connected load. The actuator may be part of an SCM assembly wherein the load is a connected shaft and piston.

The third, fourth and fifth aspects of the invention may comprise any one or more of the features of the linear actuator described above in relation to the first aspect of the invention.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Where in the foregoing description, reference has been made to specific components or integers of the invention having known equivalents, then such equivalents are herein incorporated as if individually set forth.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

Further aspects of the invention, which should be considered in all its novel aspects, will become apparent from the following description given by way of example of possible embodiments of the invention.

BRIEF DESCRIPTION OF THE DRAWINGS

An example embodiment of the invention is now discussed with reference to the Figures. Electrical conductors providing power to the SCM and receiving signals from the SCM have been omitted from the views for clarity.

FIG. 3 is a cross section view of the SCM of FIG. 1 on a plane extending on a longitudinal centreline of the SCM, and with a piston of the SCM at the bottom of its stroke.

FIG. 4 is the same cross section as FIG. 4 but with the piston at the top of its stroke.

FIG. 14 illustrates a Streaming Current Monitor (SCM) according to another embodiment.

FIG. 15 is a cross-section view of the SCM of FIG. 14 on a plane extending on a longitudinal centreline of the SCM, and with a piston of the SCM mid stroke.

BEST MODES FOR CARRYING OUT THE INVENTION

Figures 1, 2:
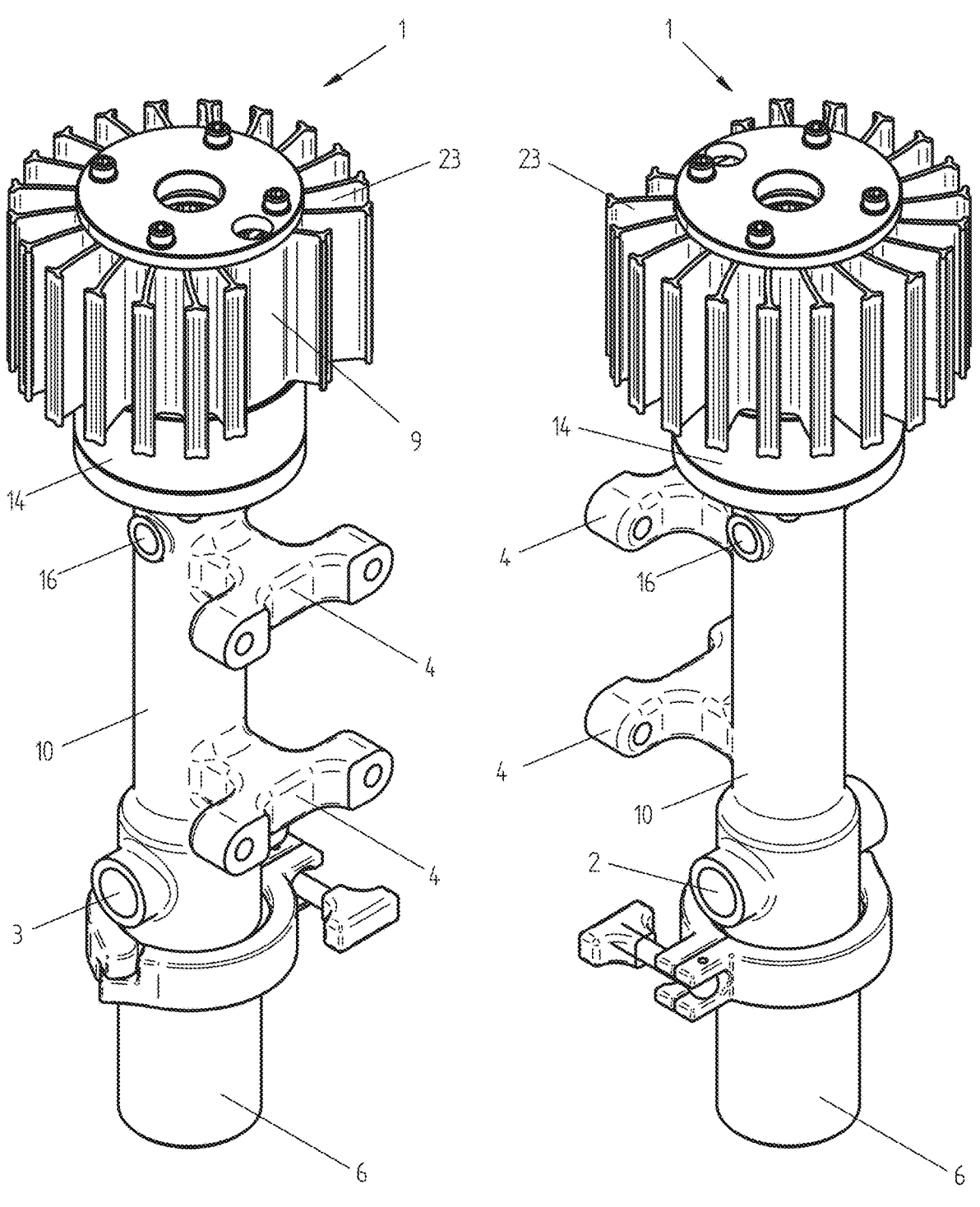
FIG. 1 illustrates a Streaming Current Monitor (SCM) according to at least one embodiment.
FIG. 2 illustrates the SCM of FIG. 1 from a different view.

FIGS. 1 and 2 show a streaming current monitor (SCM) comprising the present invention. The SCM 1 has a main body 10 comprising an inlet 2 for receiving a flow of colloid and an outlet 3 for delivering the flow of colloid. The main body comprises a pair of brackets 4 for mounting the SCM, e.g. to a wall or other support structure. With reference to FIGS. 3 and 4, a flow path extends 5 between the inlet 2 and outlet 3. A chamber or cylinder 6 (herein a cylinder) is in fluid communication with the flow path 5. In the illustrative embodiment, the cylinder 6 is below the flow path 5.

A piston 7 is received in the cylinder 6 and is configured to reciprocate within the cylinder. FIG. 3 shows the piston 7 at one end of its stroke within the cylinder 6 and FIG. 4 shows the piston 7 at an opposite end of its stroke within the cylinder 6. By example, the piston has a diameter of 15 mm and a length of about 40 mm. The illustrated embodiment has a stroke of about 10 mm however other stroke lengths and piston sizes are possible.

In the illustrated embodiment, the cylinder 6 is arranged substantially vertically and the piston 7 thus reciprocates substantially vertically within the cylinder 6. FIG. 3 shows the piston 7 at the top of its stroke and FIG. 4 the piston at the bottom of its stroke. As the piston reciprocates in the cylinder the piston causes colloid from the flow path 5 to move into and out of the cylinder via an annular space between the piston 7 and cylinder 6. Due to the closeness of the piston wall to the cylinder wall the movement of the colloid results in a high flow rate of colloid over the surfaces of the piston and cylinder. The surface of the cylinder wall gains a coating of the colloid and takes on a surface charge characteristic representative of a charge characteristic of the suspended particles of the colloid. By example, the annular space may have a radial gap between the cylinder and the piston walls of about 200 to 500 micrometres.

In the example embodiment, the piston 7 generates a negative pressure between the head 7a of the piston and the closed end of the cylinder 6a as the piston 7 moves out of the cylinder 6 (e.g. towards the top of its stroke), causing the colloid to flow into the cylinder via the annular space. The piston 7 generates a positive pressure between the head 7a of the piston 7 and the closed end of the cylinder 6a as the piston 7 moves into the cylinder 6 (e.g. towards the bottom of its stroke), forcing the colloid to flow out of the cylinder 6 back into the flow path 5 of the SCM 1.

The cylinder 6 is provided with a pair of electrodes 8. The electrodes are spaced apart along the wall of the cylinder 6 in the moving direction of the piston and are exposed to the colloid in the cylinder. In the illustrative embodiment the electrodes 8 are rings of conductive material mounted in the wall of the cylinder 6. The cylinder or cylinder wall is formed from a non-conductive material with the electrodes 8 mounted in the cylinder wall. In the illustrated embodiment, the electrodes are positioned in the annular space. The pair of electrodes may be on either side of at least a portion of the annular space. The piston or piston walls are also made from a non-conductive material. The resulting surface charge characteristic caused by the colloid being force back and forth along the annular space between the piston and cylinder walls allows for a voltage differential or electrical current signal to be measured across the electrodes 8, indicative of the charge characteristic of the colloid. In the illustrative embodiment, the electrical signal is a current and depending on the charge characteristic of the suspended particles of the colloid the signal may be in the range of about 0.05 micro Amps to 5 micro Amps. One skilled in the art will understand electrical conductors (not shown) extend from the electrodes to an electronic/electrical system (described in more detail below) for processing of the signal. An electronic/electrical system may be part of an SCM assembly or remote to the SCM. The signal may be processed to determine a dosing rate of coagulant to be dosed to the colloid to cause the suspended particles to flocculate to allow for the flocculate to be separated from the colloid fluid medium, e.g. in the treatment of waste water.

A drive mechanism 9 drives reciprocation of the piston 7 within the cylinder 6. The drive mechanism 9 is mounted to one end (the top) of the main body 10. The drive mechanism 9 is connected to the piston 7 by a shaft 11. The shaft 11 extends from the drive mechanism 9 through the main body 10 to the piston 7. The shaft 11 extends through the flow path 5. In the example embodiment, the shaft 11 is arranged vertically. The shaft is supported by a pair of bearings 12, 13. In the example the bearings are bush bearings.

In the illustrated embodiment the piston is mounted to the piston end of the shaft via a threaded connection. The piston is formed from a non-conductive material. The shaft may be formed from a metal, e.g. a stainless steel. However, in other embodiments, the shaft and piston may be integrally formed. For example, the piston and shaft may be a unitary elongate member, whereby the piston is an end portion of the unitary elongate member received within the cylinder, and the shaft a remaining portion of the unitary elongate member extending between the end portion and the actuator. The unitary elongate member may have a constant cross section, i.e. a cylinder with a constant diameter, such that the diameter of the shaft portion of the elongate member is the same as the diameter of the piston portion of the elongate member.

In the illustrated embodiment, the shaft 11 is many times longer than the piston 7. For example, the shaft length may be 3 to 6 times the length of the piston. By example, for a piston length of around 40 mm the shaft length may be more than 200 mm. The bearings 12, 13 are arranged towards opposed ends of the shaft 11. The length of the shaft 11 assists with ensuring the piston 7 remains coaxial with the cylinder 6 during operation. The length of the shaft allows for support by only two bearings spaced apart along the shaft. In the illustrated embodiment, the pair of bearings 12, 13 are located between the piston and the actuator.

The drive mechanism 9 may be removed from one end (the top) of the main body to provide access to the bearing 12 at the drive mechanism end of the shaft 11 for replacement or maintenance of the bearing 12. For example, the drive mechanism is fixed to the main body by fasteners (e.g. cap screws). The cylinder 6 may be removable from an opposite end (the bottom) of the main body 1 to provide access to the bearing 13 at the piston end of the shaft 11 for replacement or maintenance of the bearing 13. In the illustrative embodiment the drive-end bearing 12 is retained between a housing 14 of the drive mechanism 9 and the main body 10. The piston-end bearing 13 is retained by mounting the cylinder 6 to the main body 1. The piston end bearing 13 is retained within the main body by a spring 15 acting in compression between the cylinder 6 and the main body 1. In the example embodiment, the cylinder 6 is releasably mounted to the main housing by a clamp, e.g. a Tri-clamp clamping a flange on the cylinder to a flange on the main body with a seal in between.

With reference to FIGS. 3 and 4, in the illustrated embodiment, the cylinder 6 is mounted within a protective cylinder housing 6b. Cylinder 6 may be secured within the cylinder housing 6b by a potting material/compound. The cylinder housing 6b provides a flange used to couple the cylinder 6 to the main body 10. Electrical conductors (not shown) extending from electrodes 8 may be embedded in potting material between the cylinder 6 and cylinder housing 6b. The conductors may exit the cylinder housing, e.g. via a bottom aperture.

The main body 10 has an overflow port 16 arranged vertically above the inlet 2 and outlet 3. An inlet flow to the SCM may be adjusted (e.g. by a valve upstream of the SCM 1) to ensure the colloid does not overflow from the overflow port 16, ensuring a maximum head of fluid is present in the main body 10 and flow path 5. The overflow port or ports 16 may prevent the colloid reaching the drive mechanism 9 located above the overflow ports.

In accordance with at least one embodiment of the invention the drive mechanism 9 is a linear actuator. The linear actuator comprises a moving part 17 and a stationary part 18. The moving part 17 of the actuator 9 is coupled directly to the shaft 11. The drive mechanism 9 thus may be described as a direct drive linear actuator. The actuator 9, shaft 11, piston 7 and cylinder 6 are coaxially arranged.

In the illustrative embodiment the moving part 17 of the actuator 9 comprises at least one permanent magnet 19 and the stationary part 18 (the stator) comprises at least one wire coil 21. The moving part 17 is received in an inner bore of the stationary part 18. The moving part 17 comprises a support member 20 fixed to the shaft. The support member 20 supports the permanent magnet 19. The support member is formed from a non-magnetic material (e.g. a plastic material). The support member 20 is arranged between the shaft 11 and the permanent magnet 19.

The stationary part 18 comprises a bobbin 22 and the one or more coils 21 wound on the bobbin 22. The wire coil(s) 21 extend around the moving part 17 of the actuator 9. A controller (described in more detail below) provides an electrical current to the coil(s) 21 to generate a magnetic field that interacts with the magnetic field of the permanent magnet 19, resulting in a force causing movement of the moving part 17 of the actuator thus movement of the shaft 11 and connected piston 7 within the cylinder 6. In an alternative embodiment, the moving part of the linear actuator may comprise at least one wire coil and the stationary part at least one magnet. In such an embodiment, the actuator must be configured to pass electrical current to the moving part, requiring flexible electrical conductors or a sliding electrical contact. A sliding thermal contact between the stationary and moving parts for cooling the wire coil(s) during operation may also be required.

The illustrated embodiment comprises a heatsink 23 (best shown in FIGS. 1, 2 and 8) to dissipate power during operation of the SCM 1. The heatsink 23 is made from a thermally conductive material such as aluminium and includes a geometry such as fins 23a (FIG. 9) to facilitate cooling of the actuator 9. The heatsink 23 is in thermal contact with the wire coil(s) 21 of the actuator 9. The heatsink 23 may form a housing around at least part of the actuator assembly 9.

Figure 5:
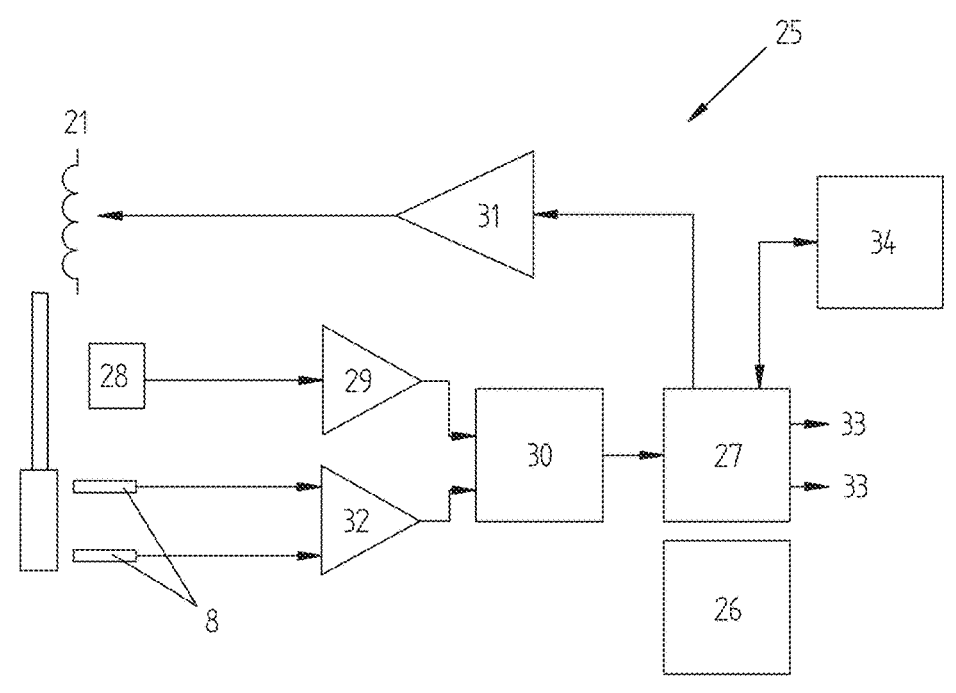
FIG. 5 is a block diagram showing a control system of the SCM of FIG. 1.

FIG. 5 provides a block diagram of a control system 25 for the SCM 1. The control system 25 comprises a power supply 26, a controller 27 and a position sensor 28. The power supply 26 may be an external or internal power supply. One skilled in the art will understand the controller 27 may be any suitable electronic controller and may comprise one or more controllers and may be provided with the SCM assembly 1 or provided remotely in wired or wireless communication with the sensors and drive mechanism of the SCM 1. The position sensor 28 is configured to sense a position of the moving part of the actuator. The position sensor 28 may be any suitable sensor known in the art, such as an incremental optical, ultrasonic, inductive, magnetic, linear variable differential transformer. An example sensor is the Texas Instruments DRV5055 hall sensor with a sensitivity of 60 mV/mT. The signal from the position sensor 28 may be amplified by a signal amplifier 29. The position signal is converted to a digital position signal by an analogue to digital converter 30 to be received by the controller 27.

The controller 27 is configured to deliver an electrical current to the wire coil(s) 21 of the actuator 9 based on the position signal from the position sensor 28 to drive reciprocating motion of the moving part 17 of the actuator 9. A power amplifier 31 may be provided amplify the electrical current provided by the controller 27 to provide an electrical current to the wire coil(s) 21 to drive reciprocation of the moving part of the actuator and connected piston 7. By example, the controller energises the actuator to generate a sinusoidal piston stroke with a stroke length of 10 mm at a frequency of 5 Hz.

The controller 27 is further configured to receive the charge characteristic signal from the streaming current electrodes 8. In the illustrative embodiment, the streaming current from the electrodes 8 may be amplified by a signal amplifier 32 and converted to a digital signal by an A to D converter 30 to be received by the controller 27. The controller 27 is configured to provide analogue and/or digital outputs 33 based on the streaming current indicative of the charge characteristic of the colloid for use in a process control relating to the flow of colloid through the SCM 1.

The control system 25 may further comprise a display and/or keypad 34 for operation of the SCM. The display may comprise an LCD/display screen configured to display information such as temperature, output signal, operational status or any other information relating to the operation of the SCM. The keypad may include an on/off button, an offset button for setting an offset and any other user input requirements, for example, a menu of parameters for configuring the SCM's output and behaviour such as analogue range or signal smoothing.

Figures 6, 7:
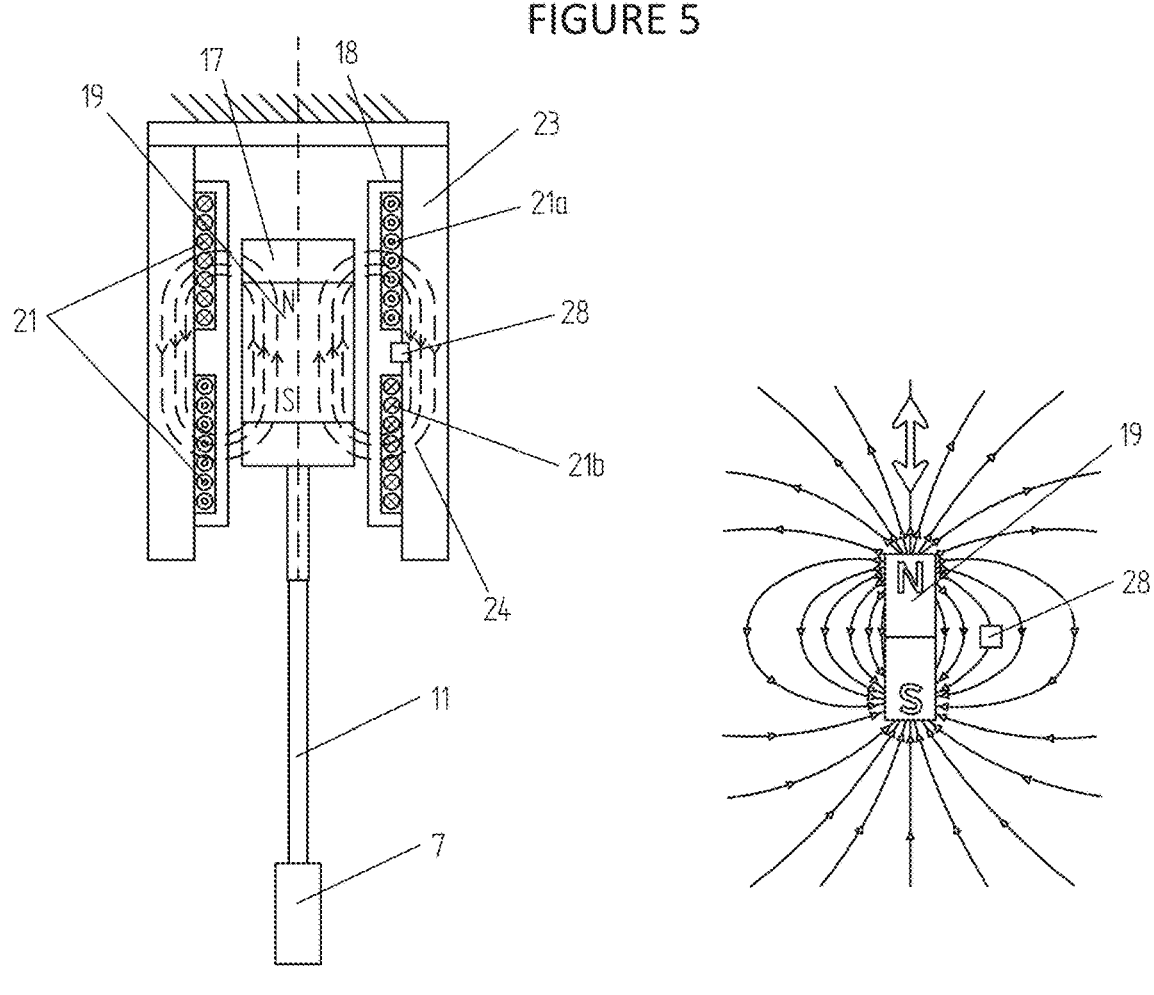
FIG. 6 is a schematic representation of a drive mechanism and connected shaft and piston of an SCM according to at least one embodiment.
FIG. 7 is a schematic representation of a magnetic field of a permanent magnet of the drive mechanism of FIG. 6.

With reference to the schematic of FIG. 6, the example embodiment comprises two axially spaced apart wire coils 21a, 21b. Each coil 21a, 21b comprises many coil windings. For example, each coil comprises 220 turns of 0.3 mm$^2$ cross section wire. The coils 21a, 21b are disposed so that one coil primarily interacts with the north end of the permanent magnet 19 and the other coil primarily interacts with the south end of the magnet 19. The coils 21a, 21b are connected in series with opposite polarity so that the magnetic field generated by each coil 21a, 21b has opposite polarity to generate a force in the same direction as each coil 21a, 21b interacts with the opposite ends of the magnet 19. By example, the permanent magnet 19 is a neodymium permanent magnet of grade N42 ring with dimensions of 1.5 inch outside diameter, 0.75 inch inner diameter, and 0.75 inch length (weight approx. 122 grams).

With reference to FIGS. 6 and 7, in some embodiments the position sensor 28 is located at an axial centre region with respect to the permanent magnet 19 of the actuator 9, so that the horizontal component of the magnetic field 24 of the magnet 19 is small, and varies linearly with the axial position of the permanent magnet 19 relative to the (fixed) position of the position sensor 28.

Figure 8:
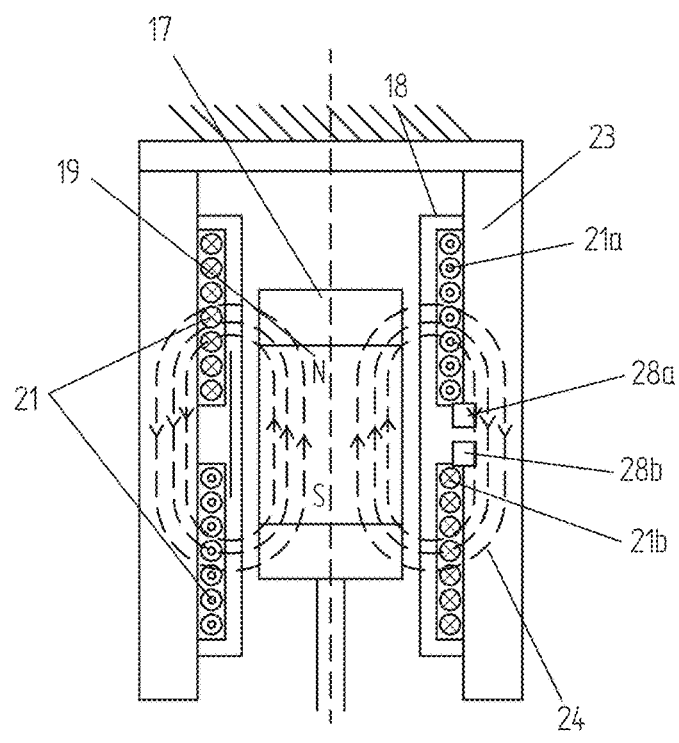
FIG. 8 is a schematic representation of an alternative drive mechanism for an SCM according to at least one embodiment.
Figure 9:
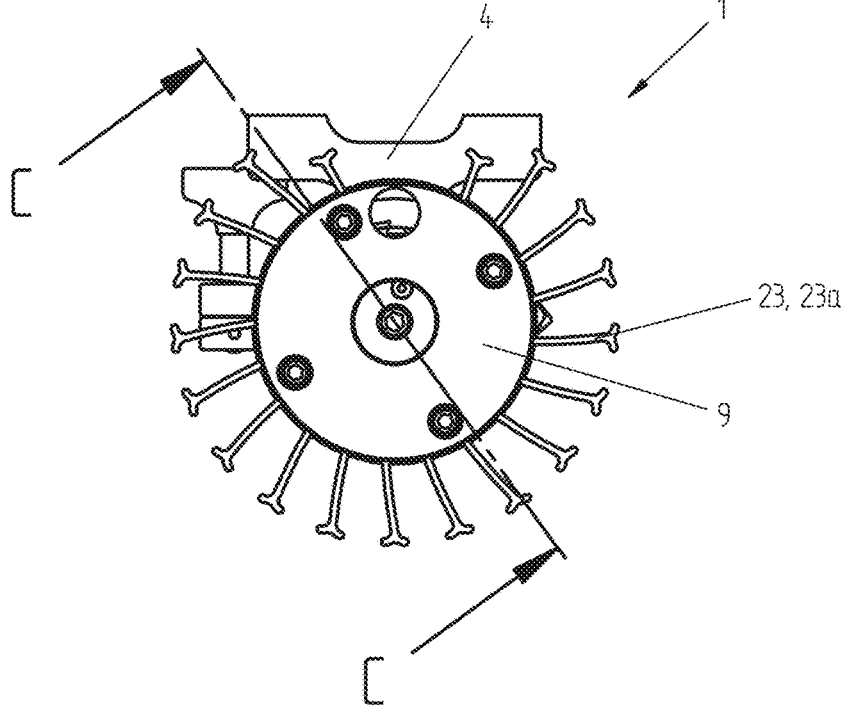
FIG. 9 is a top view of the SCM of FIG. 1.
Figure 10:
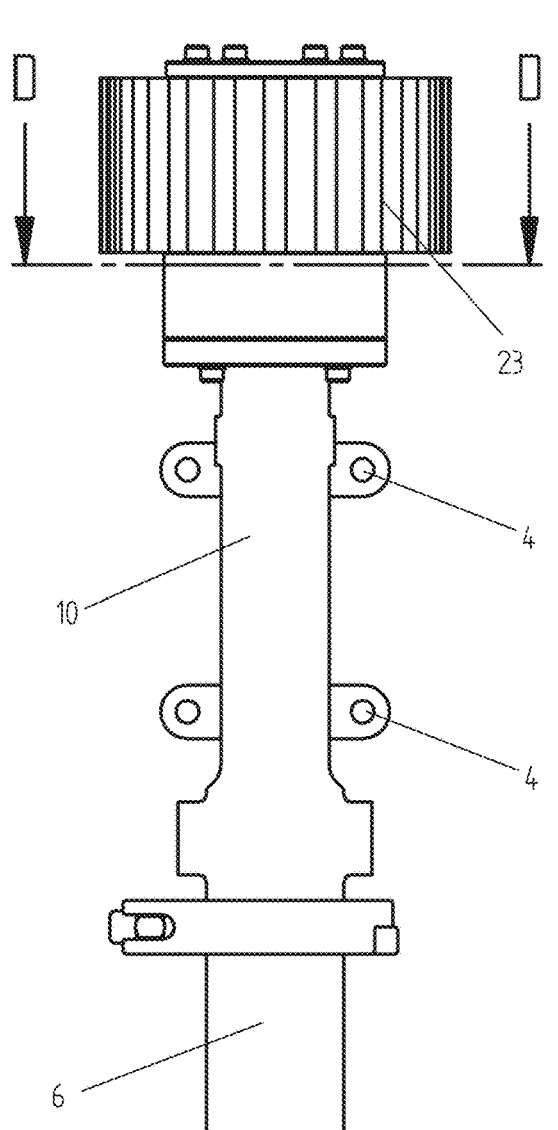
FIG. 10 is a front view of the SCM of FIG. 1.

In some embodiments, and as illustrated in FIG. 8, the SCM 1 comprises a pair of magnetic position sensors 28a, 28b spaced apart in the axial direction (the direction of movement) of the actuator 9. A pair of sensors 28a, 28b may be utilised to allow for compensation for variations in a magnetization curve of the moving part of the actuator, for example variation due to changing ambient/operational temperatures. A change in magnetization of the moving part of the actuator can be calculated from the measured field strength at each of the magnetic position sensors 28a, 28b (e.g. Hall sensors).

In one embodiment, the position of the moving part 17 can be calculated independent of magnetization as follows.

Starting with the assumption that, after an initial calibration, the position offsets of the sensors from the centre of the moving part magnetic field are known, and the measured field strength from each are linear in position with the same gradient, then:

$$h_1 = k(x + o_1)$$
$$h_2 = k(x + o_2)$$

Where:
h$_1$, h$_2$ are the measured position of the moving part of the actuator in the moving direction measured by each sensor;

k is a scaling factor relating to the measured field strength to position of the moving part of the actuator;

x is the position of the moving part of the actuator in the moving direction;

o$_1$, o$_2$ are the position offsets of the sensors in the moving direction from an arbitrary centre-point of the moving part of the actuator.

Both k and position x can be determined from measured h$_1$ and h$_2$:

$$k = \frac{h_1 - h_2}{o_1 - o_2}$$

and $$x = \frac{h_1}{k + o_1}$$

or $$k = \frac{h_2}{k + o_2}$$

By example, the two sensors are offset by 5 mm in the direction of movement (i.e. the vertical direction), making o$_1$–o$_2$=5 mm.

The piston 7 may need to be periodically replaced to ensure accuracy of the SCM is maintained. In the illustrative embodiment, the shaft 11 is connected to the moving part 17 of the actuator 9 by a fastener 40. The cylinder 6 is removable from the main body 10 and once removed, the piston 7 with shaft 11 may be easily removed via the cylinder end of the main body 10 by removing the fastener 40 to disconnect the shaft 11 from the actuator 9. Once the shaft-and-piston assembly is removed from the main body 10, the piston 7 may be disassembled from the shaft 11 and replaced with a new piston. The shaft with new piston may be reassembled to the SCM assembly 1 by reattaching to the actuator with fastener 40. This configuration allows for the piston 7 to be replaced without removing the permanent magnet 19 from the actuator coils. Removal of a strong magnet can be difficult and present a safety hazard due to the associated magnetic force. Further, as mentioned earlier, with removal of the actuator and cylinder, the two bearings at each end of the main body may also be removed and replaced. In the illustrated embodiment, the pair of bearings are located between the piston and the actuator, which further allows for easy removal of the moving assembly from the SCM for replacement of the piston. Thus, the SCM according to at least one embodiment of the present invention is configured for easy maintenance, including while the SCM remains installed within a process plant system.

Figure 11:
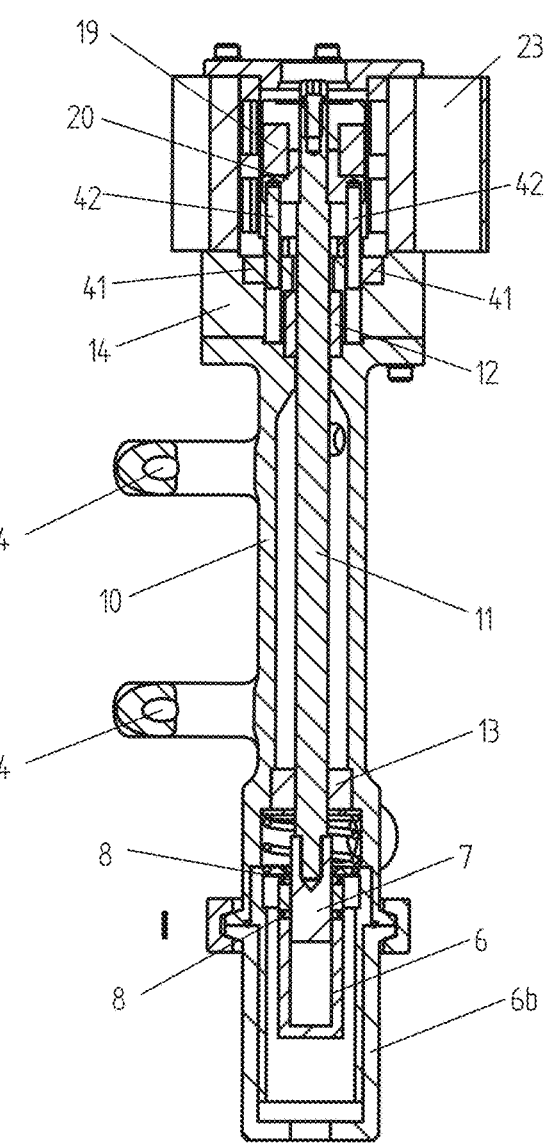
FIG. 11 is a cross section view of the SCM of FIG. 1 on the line C-C shown in FIG. 9.
Figure 12:
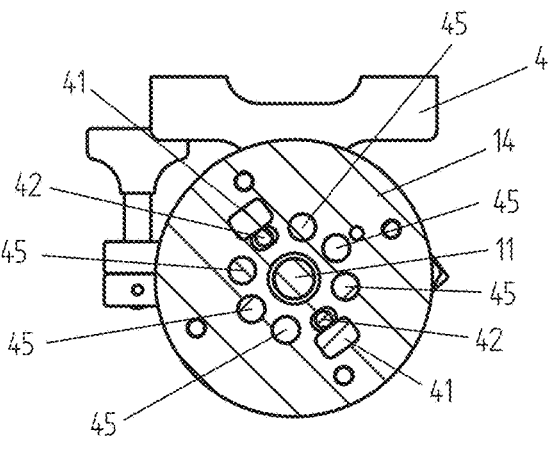
FIG. 12 is a cross section view of the SCM of FIG. 1 on the line D-D shown in FIG. 10.
Figure 13:
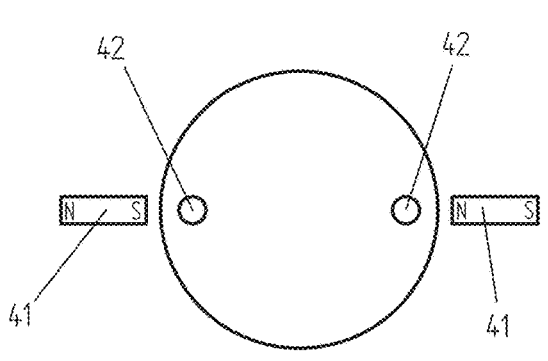
FIG. 13 is a schematic view illustrating polarity of anti-rotation magnets acting on corresponding magnetic members.

The accuracy of the SCM is improved where the piston 7 is prevented from rotation within the cylinder 6, such that the relative movement between the piston 7 and the cylinder 6 is axial only. The SCM 1 may include an anti-rotation mechanism to prevent or limit rotation of the piston 7. In some embodiments, the anti-rotation mechanism comprises at least one anti-rotation permanent magnet attached to one of the moving part 17 and stationary part 18 of the actuator 9, to interact with a corresponding at least one member formed from a magnet material attached to the other one of the moving part 17 and stationary part 18 of the actuator 9. With reference to FIGS. 11 to 13, in the illustrated embodiment, the SCM 1 comprises a pair of permanent magnets 41 coupled to the stationary part 18 of the actuator 9, and a corresponding pair of magnetic material members 42 (e.g. ferrous metal pins) attached to the moving part 17. In the example embodiment the pins 42 are fixed to the support member 20 of the moving part carrying the permanent magnet 19. As shown in FIG. 13, the permanent magnets 41 are arranged on the stationary part 18 with opposed polarities interacting with the corresponding members 42 to provide a force to oppose rotation of the moving part 17 relative to the stationary part 18. By example, the magnetic members 42 may be ferrous pins diameter 5 mm and length 38 mm, and the anti-rotation permanent magnets may be a $\frac{3}{16}$ inch cube of neodymium permanent magnet of grade N42.

Alternatively, or additionally, the anti-rotation mechanism may comprise one or more members received in a bearing, e.g. member(s) attached to one of the moving part and stationary part of the actuator, received to slide in a corresponding bearing sleeve or recess in the other one of the moving part and stationary part of the actuator. In a further alternative embodiment, the anti-rotation mechanism may comprise one or more tortional springs acting between the moving and stationary parts of the SCM.

As shown in the figures, the example embodiment is mounted in a vertical orientation, with the moving assembly 17, 11, 7 reciprocating in the vertical direction. In the vertical orientation, the weight of the moving assembly comprising the moving part of the actuator 17, the shaft 11 and the piston 7 must be supported and lifted by the magnetic field of the actuator. Providing a constant lifting force increases the power consumption of the actuator and corresponding power dissipation via the heatsink 23.

To reduce the power consumption and corresponding power dissipation, in some embodiments the SCM 1 comprises a support mechanism to support the weight of the moving assembly, thus reducing the power requirement of the actuator 9. In one embodiment, the support mechanism comprises one or more lifting permanent magnets. The lifting magnet(s) provide a lifting force to support the weight of the moving assembly 17, 11, 7.

The lifting magnets may be provided above or below the moving part 17 of the actuator. Located above, the lifting magnets provide an attractive force, and below, a repulsive force, with respect to the magnetic field of moving part 17 of the actuator. With reference to FIGS. 2, 3 and 12, in the illustrative embodiment, the SCM 1 comprises lifting magnets 45 below the moving part 17 and provide a repulsion magnetic force with respect to the magnetic field of the moving part 17 to support the weight of the moving assembly.

The lifting magnets 45 may provide a lifting force substantially equal to the weight of the moving assembly. The lifting mechanism may support the moving assembly to rest approximately at the centre of its stroke in the moving direction when the SCM is unpowered. In other words, the lifting mechanism may be configured to suspend the moving assembly at or near to the mid-point of its stroke. The force provided by the lifting magnets 45 is thus less than the weight of the moving assembly when the moving assembly is above the centre point and more than the weight of the moving assembly when the moving assembly is below the centre point. This may result in a most power-efficient operation of the SCM. With the lifting magnets 45, the force generated by the coil(s) 21 of the actuator is used to move the moving part up and down but does not substantially provide a force required to hold or support the moving assembly vertically.

As best shown in FIG. 12, by example, the SCM comprises 6 lifting magnets 45, each neodymium permanent magnet of grade N42 cylinder with dimensions of $\frac{5}{16}$ inch diameter and length 1 inch long. The magnets are positioned about 20 mm below the bottom of the permanent magnet of the moving part 17 with the moving part at the bottom of its travel. With the south pole of the moving magnet 19 lowermost, the lifting magnets 45 are oriented with the south pole upwards, to repel the moving assembly in an upwards direction to support its weight. One skilled in the art will appreciate that other configurations are possible, such as with the moving magnet 19 with north pole lowermost and the lifting magnets 45 with north pole uppermost, or with the lifting magnets 45 positioned above the moving magnet 19 with lifting magnets 45 south/north pole facing the moving magnet 19 uppermost north/south pole providing an attracting magnetic lifting force. By example, the moving assembly may weight approximately 430 grams.

In alternative embodiments the support mechanism may comprise one or more springs, for example one or more compression springs below the moving part 17 or one or more tension springs above the moving part 17. Again, the springs may be configured to support the weight of the moving assembly, and/or suspend the moving assembly at the vertical centre of its travel when the SCM is unpowered. The one or more springs may additionally prevent or reduce relative rotation between the moving part and the stationary part.

FIGS. 13 and 14 illustrate another embodiment of the present invention 101. The SCM of FIGS. 13 and 14 is substantially similar to the earlier described embodiment 1 and is therefore not described in detail other than to note the below described differences. The same parts therefore have been given the same reference numeral and like parts the same reference numeral with the addition of 100.

In the embodiment 101 of FIGS. 14 and 15, the piston end bearing 13 is retained within the main body 10 by a screw 50 received through a wall of the main body 10. The screw supports the bearing 13 to prevent the bearing dropping below its installed position. The SCM 101 therefore does not incorporate the spring 15 described in the earlier embodiment.

In embodiment 101 the heatsink 123 has a longer length than in the earlier embodiment 1, so that the heatsink 123 extends a further distance above and below the stationary part 18 of the actuator. For example, the heatsink 123 extends approximately 60 mm above the stationary part 18 and extends approximately 50 mm below the stationary part 18. The extra length of the heatsink shields personal from the magnetic field of the drive mechanism and thus reduces a risk of personnel getting too close to the magnetic field generated by the linear actuator. The heatsink may have a length of about 165 mm and an outside diameter of about 130 mm with the illustrated fins 123a having a radial length of about 23 mm.

Embodiment 101 has alternative mounting brackets 104 to the earlier described embodiment 1. The mounting brackets 104 include mounting blocks 104a formed from any suitable material such as an engineering plastics or metal (e.g. stainless steel) material. The brackets 104 and mounting blocks comprise mounting holes for fixing the SCM to a support such as wall or other bracket.

An SCM according to one or more aspects of the present invention as described above provides for one or more of the following benefits. The SCM avoids complex motor and gearbox arrangements and related maintenance and reliability issues. The direct drive linear actuator simplifies the SCM assembly and reduces power consumption. The direct drive linear actuator SCM has a single moving assembly and avoids side loads on the bearing arrangements. This reduces wear, resulting in lower maintenance requirements and improved accuracy. Maintenance requirements are reduced and simplified, since bearings are easily accessible and the piston is easily removed and replaced, without a requirement to remove or disassemble the drive mechanism. A moving part support mechanism further reduces power consumption and power dissipation. The linear actuator may be energised by a low voltage DC power supply, e.g. 12-24 Vdc power supply, compared to a mains 110/240 Vac main power supply, simplifying regulatory approval requirements, especially for use in a water environment. However, in some embodiments a mains power supply may be employed.

Although this invention has been described by way of example and with reference to possible embodiments thereof, it is to be understood that modifications or improvements may be made thereto without departing from the spirit or scope of the appended claims.

The invention claimed is:

1. A streaming current monitor (SCM) comprising:
an inlet and an outlet to receive and deliver a flow of colloid to and from the SCM;
a cylinder in fluid communication with a flow-path between the inlet and outlet, and a piston received in the cylinder to reciprocate therein,
a drive mechanism to drive reciprocation of the piston in the cylinder to move colloid into and out of the cylinder via an annular space between the piston and cylinder,
a pair of electrodes exposed in a wall of the cylinder and spaced apart in a moving direction of the piston, and
a shaft extending between the piston and the drive mechanism, wherein
the drive mechanism is a linear actuator comprising a stationary part comprising at least one wire coil and a moving part comprising at least one permanent magnet, the at least one permanent magnet connected to the shaft, the moving part, shaft and piston together forming a moving assembly, the at least one coil configured to generate a magnetic force to drive reciprocation of the moving assembly.

2. The SCM as claimed in claim 1, wherein the stationary part comprises two wire coils spaced apart in a moving direction of the moving part, a first coil primarily interacts with a north end of the permanent magnet and a second coil primarily interacts with a south end of the permanent magnet.

3. The SCM as claimed in claim 1, wherein the SCM comprises at least one magnetic position sensor to provide an indication of a position of the permanent magnet of the moving part of the linear actuator, the at least one position sensor located at an axial centre region of the permanent magnet.

4. The SCM as claimed in claim 3, wherein the at least one position sensor comprises a pair of position sensors spaced apart in a moving direction of the permanent magnet, and
a controller configured to determine the position of the moving part independent of a variation in a magnetization of the permanent magnet based on output from the pair of position sensors.

5. The SCM as claimed in claim 1, wherein the shaft is removably connected to the moving part of the actuator, so that the shaft and piston is removable from the SCM without removing the permanent magnet from the linear actuator.

6. The SCM as claimed in claim 1, wherein the SCM comprises a pair of bearings supporting the shaft, the pair of bearings located between the moving part and the piston.

7. The SCM as claimed in claim 6, wherein the bearings are arranged towards opposed ends of the shaft.

8. The SCM as claimed in claim 6, wherein the shaft is many times longer than the piston.

9. The SCM as claimed in claim 6, wherein the pair of bearing comprises a piston end bearing and a drive end bearing, and wherein the cylinder is removably mounted to a main body of the SCM to provide access to the piston end bearing and the linear actuator is removably mounted to the main body to provide access to the drive end bearing.

10. The SCM as claimed in claim 1, wherein the SCM comprises an anti-rotation mechanism to prevent or limit relative rotation between the piston and cylinder.

11. The SCM as claimed in claim 10, wherein the anti-rotation mechanism comprises at least one permanent magnet fixed to one of the moving part and stationary part to interact with a member formed from a magnet material fixed to the other one of the moving part and stationary part.

12. The SCM as claimed in claim 10, wherein the anti-rotation mechanism comprises a pair of permanent magnets fixed to one of the moving part and stationary part to interact with a pair of members formed from a magnet material fixed to the other one of the moving part and stationary part, and wherein the pair of permanent magnets are arranged with opposed polarities interacting with the corresponding pair of members.

13. The SCM as claimed in claim 1, wherein the SCM comprises a support mechanism to support the weight of the moving assembly.

14. The SCM as claimed in claim 13, wherein the support mechanism comprises at least one lifting permanent magnet arranged above or below the moving part of the linear actuator to attract or repel the moving part to support the weight of the moving assembly.

15. The SCM as claimed in claim 13, wherein the support mechanism is configured to provide a lifting force substantially equal to the weight of the moving assembly.

16. The SCM as claimed in claim 13, wherein the support mechanism supports the moving assembly approximately at the centre of its stroke with the SCM unpowered.

17. The SCM as claimed in claim 13, wherein a force generated by an electrical current in one or more coils of the linear actuator is sufficient to drive reciprocation of the moving assembly without substantially providing a force required to support the weight of the moving assembly.

18. The SCM as claimed in claim 1, wherein the SCM comprises a heatsink in thermal contact with wire coil(s) of the actuator, and wherein the heatsink forms a housing around at least part of the linear actuator.

19. The SCM as claimed in claim 18, wherein the heatsink extends above and below the stationary part of the linear actuator to shield personnel from a magnetic field of the linear actuator.

20. The SCM as claimed in claim 1, the SCM comprising:

a position sensor configured to sense a position of the moving part of the actuator, and a controller configured to deliver an electrical current to the wire coil(s) based on a position signal from the position sensor to drive a sinusoidal reciprocating motion of the moving part of the actuator.

\* \* \* \* \*